(12) United States Patent
Bérubé et al.

(10) Patent No.: US 12,474,526 B2
(45) Date of Patent: Nov. 18, 2025

(54) MANAGING PHOTONIC INTEGRATED CIRCUIT OPTICAL COUPLING

(71) Applicant: Ciena Corporation, Hanover, MD (US)

(72) Inventors: Jean-Philippe Bérubé, Saint-Augustin (CA); Marie-Josee Picard, L'Ancienne-Lorette (CA)

(73) Assignee: Ciena Corporation, Hanover, MD (US)

( * ) Notice: Subject to any disclaimer, the term of this patent is extended or adjusted under 35 U.S.C. 154(b) by 304 days.

(21) Appl. No.: 18/177,844

(22) Filed: Mar. 3, 2023

(65) Prior Publication Data

US 2024/0295697 A1 Sep. 5, 2024

(51) Int. Cl.
*G02B 6/26* (2006.01)

(52) U.S. Cl.
CPC .................... *G02B 6/262* (2013.01)

(58) Field of Classification Search
CPC ................ G02B 6/262; G01M 11/30
See application file for complete search history.

(56) References Cited

U.S. PATENT DOCUMENTS

| 7,783,146 B2 | 8/2010 | Blauvelt et al. | |
| 2023/0358976 A1* | 11/2023 | Hu | G02B 6/4214 |

OTHER PUBLICATIONS

Jean-Philippe Bérubé et al., "Direct Inscription of on-surface waveguides in polymers using a mid-ir fiber laser," Optics Express, Oct. 14, 2019, vol. 27, No. 21, pp. 31013-31022.
Jean-Philippe Bérubé et al., "Femtosecond laser direct inscription of surface skimming waveguides in glass," Optics Letters, Jul. 2016, 6 pages.
R. Polster et al., "Wafer-scale high-density edge coupling for high throughput testing of silicon photonics", M3F.2, pp. 1-3, OFC 2018.

* cited by examiner

*Primary Examiner* — Chad H Smith
(74) *Attorney, Agent, or Firm* — Young Basile Hanlon & MacFarlane, P.C.

(57) ABSTRACT

An apparatus for coupling an external optical interface to a first optical interface of a photonic integrated circuit comprises: a substrate comprising an optically transmissive material; and a first optical waveguide core formed in proximity to a first surface of the substrate. The first optical waveguide core comprises: a first portion comprising the external optical interface, a second portion that is (1) adjacent to the first surface of the substrate, and (2) adjacent to a second surface of the substrate at an acute angle with the first surface of the substrate, and a third portion between the first and second portions that is separated from the first surface of the substrate by a thickness of the optically transmissive material.

20 Claims, 5 Drawing Sheets

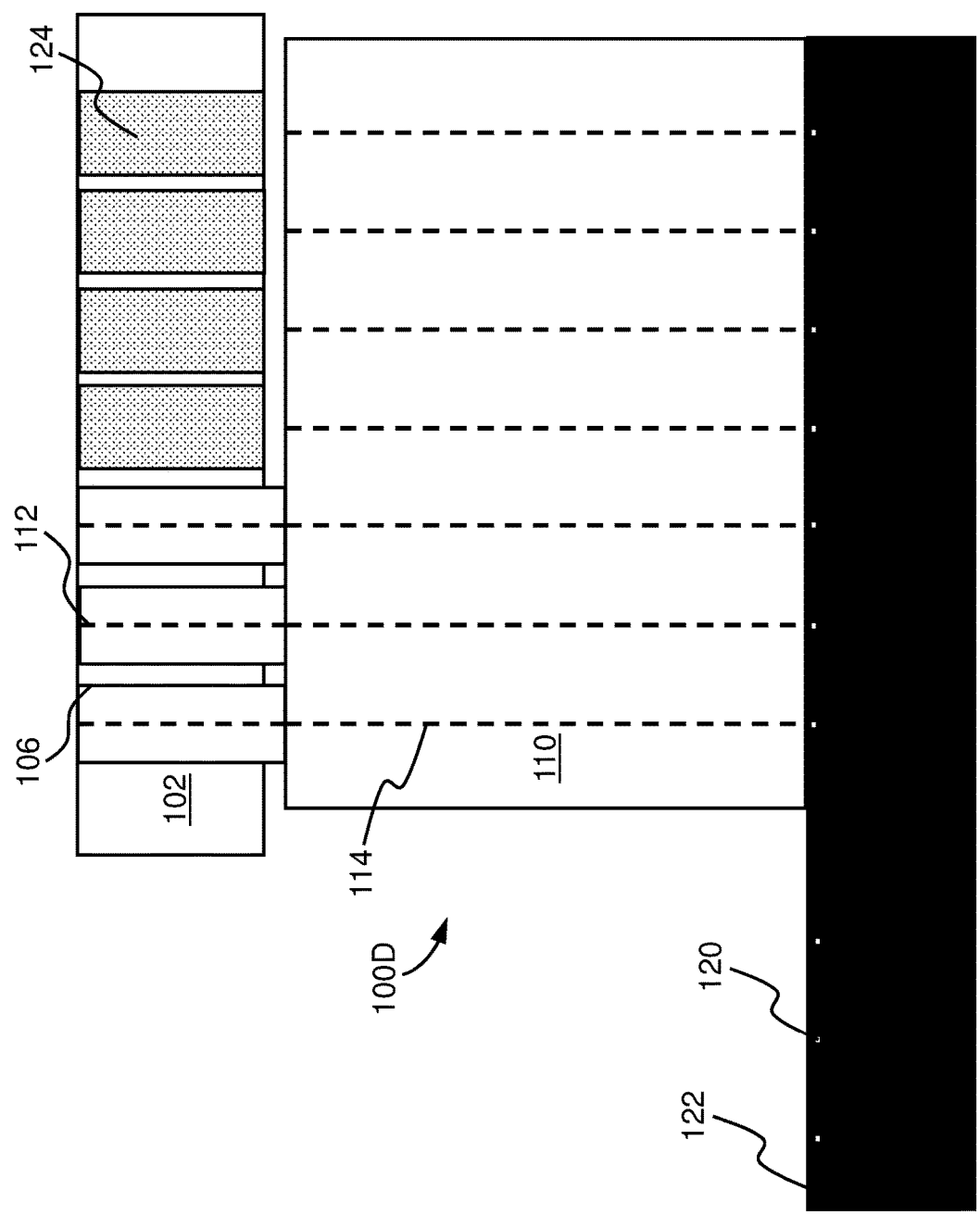

MANAGING PHOTONIC INTEGRATED CIRCUIT OPTICAL COUPLING

TECHNICAL FIELD

This disclosure relates to managing photonic integrated circuit optical coupling.

BACKGROUND

Complementary metal-oxide-semiconductor (CMOS) and other fabrication techniques are generally used to fabricate electronic integrated circuits (ICs), which operate using electrical signals (e.g., voltage signals and/or current signals). Similar fabrication techniques can be used to fabricate photonic integrated circuits (PICs) in silicon photonic (Si-Phot) or other photonic platforms. PICs often include optical waveguides for transporting optical waves to and from photonic devices. An optical waveguide is a structure that confines and guides the propagation of an electromagnetic wave. Some electromagnetic waves have a spectrum that has a peak wavelength that falls in a particular range of optical wavelengths (e.g., between about 100 nm to about 1 mm, or some subrange thereof), also referred to as optical waves, light waves, or simply light. Coupling light into or out of a PIC from or to an optical fiber or other medium can be challenging.

SUMMARY

In one aspect, in general, an apparatus for coupling an external optical interface to a first optical interface of a photonic integrated circuit comprises: a substrate comprising an optically transmissive material; and a first optical waveguide core formed in proximity to a first surface of the substrate. The first optical waveguide core comprises: a first portion comprising the external optical interface, a second portion that is (1) adjacent to the first surface of the substrate, and (2) adjacent to a second surface of the substrate at an acute angle with the first surface of the substrate, and a third portion between the first and second portions that is separated from the first surface of the substrate by a thickness of the optically transmissive material.

In another aspect, in general, a method for fabricating a coupler for coupling an external optical interface to a first optical interface of a photonic integrated circuit comprises: forming a substrate comprising an optically transmissive material; and forming a first optical waveguide core formed in proximity to a first surface of the substrate. The first optical waveguide core comprises: a first portion comprising the external optical interface, a second portion that is (1) adjacent to the first surface of the substrate, and (2) adjacent to a second surface of the substrate at an acute angle with the first surface of the substrate, and a third portion between the first and second portions that is separated from the first surface of the substrate by a thickness of the optically transmissive material.

Aspects can include one or more of the following features.

The apparatus further comprises a second optical waveguide core formed in proximity to the first surface of the substrate, the second optical waveguide core comprising a first portion comprising a second external optical interface, a second portion that is (1) adjacent to the first surface of the substrate, and (2) adjacent to the second surface of the substrate, and a third portion between the first and second portions that is separated from the first surface of the substrate by a thickness of the optically transmissive material.

The acute angle is between about 10 degrees to 80 degrees.

The thickness of the optically transmissive material by which the third portion is separated from the first surface of the substrate is less than 0.1 microns.

The second and third portions are at opposite ends of a straight segment of the first optical waveguide core.

The second and third portions are at opposite ends of a curved segment of the first optical waveguide core.

The apparatus further comprises the photonic integrated circuit, where the second portion of the first optical waveguide core is positioned less than 0.1 microns from the first optical interface of the photonic integrated circuit.

The photonic integrated circuit is fabricated on a portion of a silicon-on-insulator wafer.

A portion of the first optical waveguide core extends into a trench of the photonic integrated circuit.

The first optical waveguide core is optically coupled to at least one passive optical element.

The passive optical element comprises a ring resonator or a Sagnac loop.

The first optical waveguide core is optically coupled to a wavelength-dependent optical element.

The first optical waveguide core is optically coupled to a second optical waveguide core formed in proximity to the first surface of the substrate.

The second optical waveguide core is optically coupled to a second optical interface of the photonic integrated circuit.

The second portion of the first optical waveguide core is positioned based at least in part on an optical test signal received from the photonic integrated circuit.

The apparatus further comprises a second optical waveguide core formed in proximity to the first surface of the substrate that is optically isolated from the first optical waveguide core.

The external optical interface further comprises an adhesive with an index of refraction substantially matching an index of refraction of the optically transmissive material.

Aspects can have one or more of the following advantages.

The production of photonic chips can be aided by the implementation of tests performed at the wafer level rather than at the level of the individual dies that are formed after dicing the wafer. The techniques described herein can facilitate the wafer level optical coupling that can facilitate such wafer level testing. The corner-coupled optical coupler described herein may have fewer optical interfaces when coupling to other structures, resulting in lower optical losses. The fabrication process of the corner-coupled optical coupler may be simpler and enable more diverse applications than other optical couplers, for example, by allowing any optically transmissive material to act as a substrate and by potentially requiring less cleaving and polishing than other optical couplers. Furthermore, the corner-coupled optical fiber can be customized to the shape and size of the structures it is coupling to, which can have beneficial applications (e.g., more compact coupling, more compact photonic circuit designs to be tested). The reduced fabrication complexity may also result in a reduction of cost to manufacture. Additionally, compared to side-coupling performed via ferruled optical fiber, the corner-coupled optical coupler can be more compact. The corner-coupled optical coupler may also allow for optical functionality to be built into the substrate in which the corner-coupled optical coupler is formed. Such functionality could provide wavelength selectivity, interferometric measurements, beam-splitting, and beam-combining, for example.

Other features and advantages will become apparent from the following description, and from the figures and claims.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions and angles of the various features are arbitrarily expanded or reduced for clarity.

FIG. 1D is a schematic diagram of a corner-coupled optical coupler optically coupled to a spot-size converter of a Si waveguide, viewed from a cross-sectional front view.

DETAILED DESCRIPTION

Figure 1A:
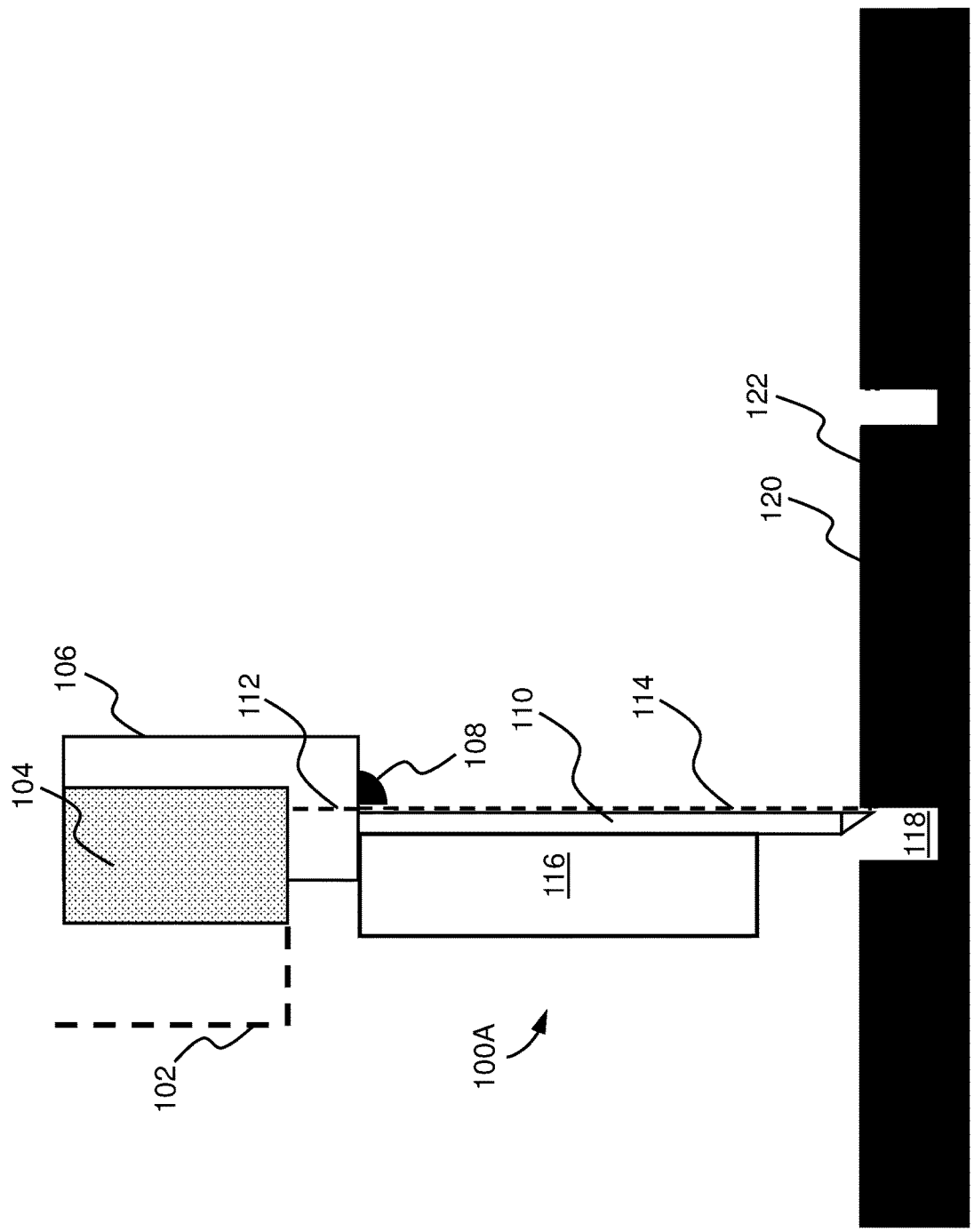
FIG. 1A is a schematic diagram of a corner-coupled optical coupler optically coupled to a spot-size converter of a Si waveguide, viewed from a cross-sectional side view.

The corner-coupled optical coupler described herein can be used to optically probe a wafer or chip. The corner-coupled optical coupler can comprise any number of optical waveguide cores fabricated (e.g., photo-inscribed) in proximity to the surface of a transparent substrate (e.g., glass, polymer, sapphire) to couple light into and/or out of SiPhot circuits, depending on any spacing constraints (e.g., leaving tolerance between waveguide cores of 20-25 microns), and/or other constraints. For example, the substrate can consist essentially of an optically transmissive material (e.g., a material with transmissivity of at least 50% in at least a portion of the optical spectrum). The substrate provides the cladding around the core such that an optical mode guided by the resulting waveguide depends on the attributes such as the cross-sectional shape of the core, and the index contrast (i.e., difference between the refractive indices) between the core and the substrate. A process such as photo-inscription (e.g., using focused optical energy to increase the refractive index of the substrate material below the surface) can produce a higher-index optical waveguide core. Alternatively, photo-inscription could be used to decrease a the refractive index to form a cladding around a glass core with an unchanged refractive index. Since the core is formed in proximity to a surface of the substrate, an evanescent field of the guided mode can in some cases also extend beyond that surface into the air (or another material) on the other side of that surface. In some implementations, there can even be portions of the waveguide where the core is adjacent to the substrate of the surface, including the portion at the end forming a corner-coupled arrangement, as described in more detail below. After forming the core within the substrate, the end-face of the substrate can be cleaved and/or polished at an angle to reflect guided light from the end facet and direct light at an appropriate angle to enable coupling in or out of a wafer or chip (e.g., through a spot size converter (SSC) on the edge of the wafer or chip).

There are advantages to ensuring the optical waveguide core near the end-face of the substrate is adjacent to the surface without any significant amount of the substrate material remaining. In particular, the guided light can be reflected to or from the wafer or chip without propagation through any significant amount of the substate material. Avoiding propagation in the substrate material allows for lower loss since the core-to-substrate interface and the substrate-to-air interface that would otherwise be there is absent. The coupler can be pushed in contact against a waveguide core structure of a coupler (e.g., SSC) integrated in the wafer or chip and direct waveguide-to-SSC coupling can be achieved. Moreover, divergence of the beam that would have been caused by propagation in the substrate material can be avoided.

Fabrication parameters of the corner-coupled optical coupler can be adjusted to customize the size and shape of the near-surface waveguide cores and optimize coupling with other structures (e.g., a Si waveguide within a wafer or chip). Positioning of the optical waveguide cores in the corner-coupled optical coupler can also be tailored to accommodate a given wafer architecture. For example, a corner-coupled optical coupler may comprise one or more waveguide cores arranged to couple to one or more structures (e.g., one or more waveguides under test). Tapered structures such as an optical coupler, ring resonator or a Sagnac loop could also be integrated into the same substrate as the corner-coupled optical coupler.

FIG. 1A shows an example corner-coupled optical coupler 100A, viewed from the side. A fiber holder 102 with a V-groove 104 holds a fiber cladding 106. An adhesive 108 adheres the fiber cladding 106 to the substrate 110. In some implementations, the adhesive 108 can be an index-matching adhesive with substantially the same index of refraction as the substrate 110. A fiber core 112 is optically coupled to a waveguide core 114. In this example, the substrate 110 is mounted on a glass block 116, but the substrate 110 can optionally be mechanically secured to any of a variety of structures in other examples. The corner-coupled optical coupler 100A extends into a dicing trench 118 and optically couples the waveguide core 114 into an SSC 120 located on a silicon (Si) wafer 122 on which a photonic integrated circuit has been fabricated. Alternatively, in other examples, instead of a SSC, other kinds of couplers into which light can be coupled are core size matched edge couplers that bring the waveguide all the way to the edge or fit directly between the edge and the waveguide. An end surface of the waveguide core 114 and the substrate 110 is cut at an acute angle with respect to a larger surface (extending into the page in FIG. 1A) to direct light that is being guided by the waveguide core 114 into the SSC 120 (or vice versa). The reflection from the end surface can be based on total internal reflection, for example, or based on a reflective coating on the end surface in other examples.

Figure 1B:
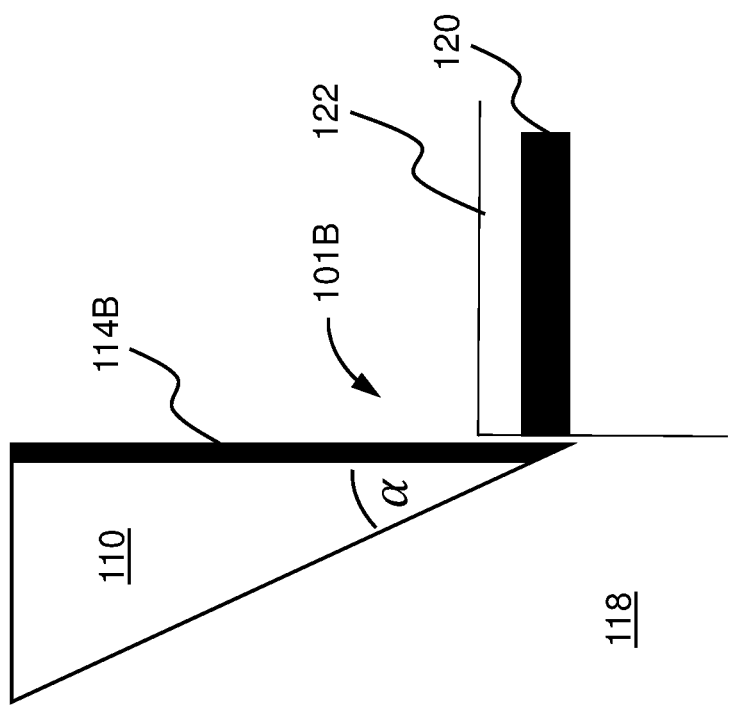
FIG. 1B is a schematic diagram of an optical interface between a corner-coupled optical coupler and a spot-size converter, viewed from a cross-sectional side view.

FIG. 1B shows an example optical interface portion 101B of the corner-coupled optical coupler 100A that enables a corner-coupling connection to a spot-size converter 120 based on an acute angle α (e.g., 45 degrees, or in some implementations between about 10 degrees to about 80 degrees) between surfaces at the tip of the waveguide core 114B, viewed from the side. In this example, a waveguide core 114B is substantially straight in the vicinity of the optical interface portion 101B, extends into the dicing trench 118, and optically couples to the SSC 120 on the Si wafer 122. A substantial portion of the waveguide core 114B may be fully surrounded by the substrate 110, and the waveguide core 114B may be fabricated to be located at various depths with respect to the substrate 110. At the point where the waveguide core 114B couples to the SSC 120, the waveguide core 114B is located on the exterior of the substrate 110.

Figure 1C:
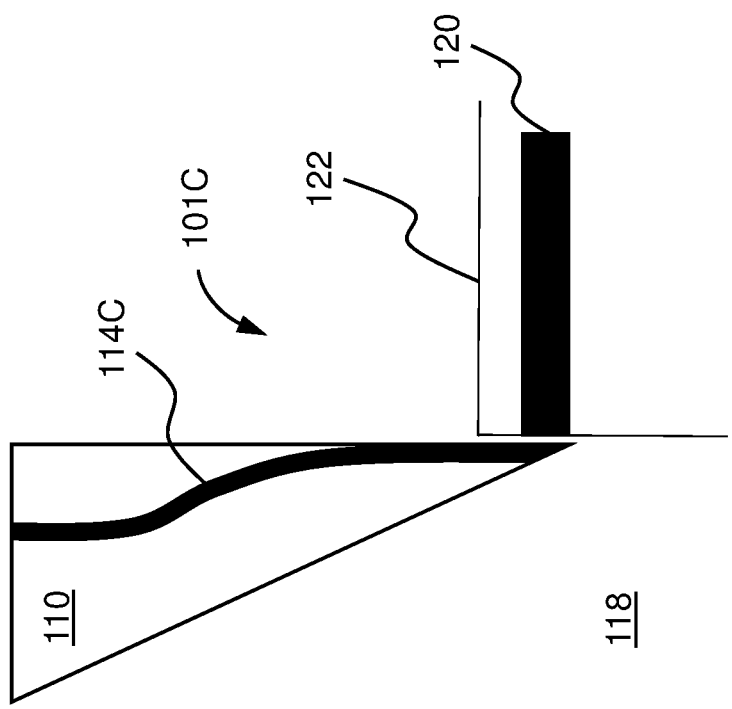
FIG. 1C is a schematic diagram of a portion of a corner-coupled optical coupler, viewed from a cross-sectional side view.

FIG. 1C shows an example optical interface portion 101C of the corner-coupled optical coupler 100A that enables a corner-coupling connection to the spot-size converter 120 based on an acute angle (e.g., 45 degrees) between surfaces at the tip of the waveguide core 114B, viewed from the side. In this example, a waveguide core 114C has a curved propagation path in the vicinity of the optical interface portion 101C, but still extends into the dicing trench 118, and optically couples to the SSC 120 on the Si wafer 122. A substantial portion of the waveguide core 114C may be fully surrounded by the substrate 110, and the waveguide core 114C may be fabricated to be located at various depths with respect to the substrate 110. At the point where the waveguide core 114C couples to the SSC 120, the waveguide core 114C is located on the exterior of the substrate 110.

FIG. 1D shows a schematic diagram of an example corner-coupled optical coupler 100D, viewed from the front. In this example empty V-grooves 124 allow for additional optical fibers to be added. In this example, the substrate 110 includes multiple waveguide cores 114 that are corner-coupled into different respective SSCs 120.

Some optical couplers that do not use the corner-coupling technique described herein may have additional interfaces between a waveguide on the optical coupler and a spot-size converter on the wafer or chip. For instance, in such optical couplers, propagation in substrate material may be unavoidable. In some cases, the complex fabrication methods (e.g., time consuming polishing with high precision) that would be needed to remove the substrate material is not even considered because it would lead to costly and/or low-yield manufacturing. Additionally, fabrication of some optical couplers may be limited to certain substrate materials. The corner-coupled optical coupler described herein can include a substrate constructed from any of a variety of transparent materials.

Other optical couplers that do not use the corner-coupling technique described herein may include optical coupling arrangements with possibly more complex architectures. Such arrangements may be based on 3D printed micro-optics, which can require costly fabrication equipment. For example, the 3D printing techniques used to fabricate the optical coupling arrangements may necessitate costly and/or dedicated equipment for relatively limited use. The optical coupling losses of such optical couplers can be prohibitively high in some cases.

The corner-coupled optical coupler can include near-surface waveguide cores, which allow for direct coupling between a waveguide and a spot-size converter (SSC) with no additional interfaces in-between (e.g., light can be coupled directly from the waveguide to a silicon chip or wafer without propagating in the substrate material). In some implementations, the optical coupler can be maneuvered into contact against a chip or wafer and direct waveguide-to-SSC coupling can be achieved. Such a configuration can reduce optical loss and eliminate waveguide-to-substrate and/or substrate-to-air interface(s).

The fabrication of corner-coupled optical couplers can be considerably simpler than fabrication of other optical couplers. For example, large number of waveguide cores can be inscribed on a single cm-long thin glass plate. Then, the glass plate can be polished at an angle, and in some cases can also be diced into individual corner-coupled optical couplers. Such a fabrication process may be scaled up for high production volume.

Additionally, corner-coupled optical couplers may include near-surface waveguide cores that can be inscribed in relatively close proximity (e.g., less than 0.2 µm, or other distances, which may be limited by surface roughness of the substrate material in some cases) to the surface of the substrate, allowing for the fabrication of precisely tailored optical couplers. The size and geometry of the corner-coupled waveguide cores can be optimized during fabrication and the angle of the end surface of the glass plate may be modified via polishing. The presence of near-surface waveguide cores allows for light propagation, after reflection at the angled waveguide-air interface, to occur strictly in the waveguide core of the modified substrate material before making contact with the optical interface of the chip or wafer (e.g., no propagation in unmodified substrate material).

The corner-coupled optical coupler has several features which may result in a reduction of cost and/or complexity when fabricating the corner-coupled optical coupler or using it for testing a chip or wafer. For example, when used as a photonic chip probe, the corner-coupled optical coupler may be customized to fit a wafer under test, and may be used to probe without contact at the wafer-level. Furthermore, both in and out light coupling can be implemented with the corner-coupled optical coupler, which may further reduce set-up complexity. In other non-corner-coupled optical couplers, optical fibers are used to couple light in and out of the chip or wafer through a surface grating coupler instead of a SSC or other end-facet optical interface that enables side coupling. The corner-coupled optical coupler can be used for side coupling with reduced optical loss. As a result of the reduced optical loss, the signal to noise ratio of an optical measurement may be enhanced and post-measurement analysis eased. For example, side coupling can be performed using a 100 µm microscope slide, which may be significantly more compact than other couplers that may accomplish side coupling (e.g., by ferruling an optical fiber).

Additional optical functionality can be implemented within the corner-coupled optical coupler. For example, the corner-coupled optical coupler can comprise a ring resonator, a Sagnac loop, and/or may be split into two or more waveguides or merged from two or more waveguides. In some implementations, the core-couple optical coupler may be used to perform characterization of one or more SSCs used in production die circuits.

Figure 1E:
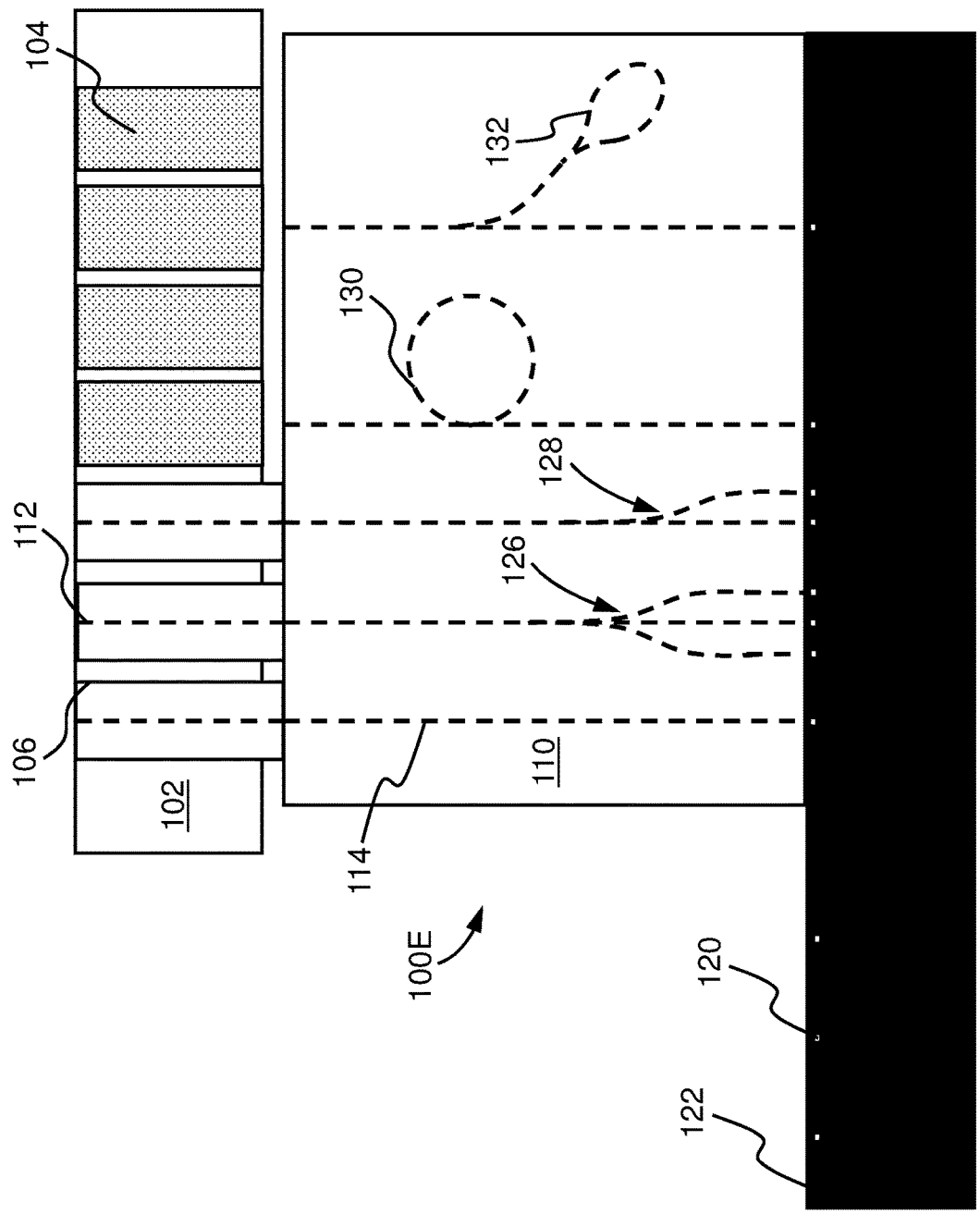
FIG. 1E is a schematic diagram of a corner-coupled optical coupler optically coupled to a spot-size converter of a Si waveguide, viewed from a cross-sectional front view.

FIG. 1E shows a schematic diagram of an example corner-coupled optical coupler 100E, viewed from the front. A 33/33/33 coupler 126 allows for light from three waveguides to be merged into one waveguide, or for light from one waveguide to be divided between three waveguides. Similarly, a 50/50 coupler 128 allows for light from two waveguides to be merged into one waveguide, or for light from one waveguide to be divided between two waveguides. Each respective waveguide of the 33/33/33 coupler 126 and the 50/50 coupler 128 is optically coupled to a respective SSC 120 on the Si wafer 122. A ring resonator 130 (e.g., implementing a spectral filter) and a Sagnac loop 132 (e.g., implementing a mirror) provide additional optical functionality to the corner-coupled optical coupler 100E. Such functionality can be used for various tests of photonic chips located on the Si wafer 122. Alternatively, in other example implementations, the V-groove pitch doesn't have to be respected when coupling into SSCs. The photo-inscription can route the waveguides laterally without any particular constraints associated with the V-grooves.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An apparatus for coupling an external optical interface to a first optical interface of a photonic integrated circuit, the apparatus comprising:
    a substrate comprising an optically transmissive material; and
    a first optical waveguide core formed in proximity to a first surface of the substrate, the first optical waveguide core comprising
        a first portion in optical communication with the external optical interface to couple optical waves between the first portion and the external optical interface,
        a second portion that is (1) in proximity to the first surface of the substrate, and (2) adjacent to a second surface of the substrate at an acute angle with the first surface of the substrate and configured to reflect the optical waves before or after they propagate through the first surface of the substrate, and
        a third portion between the first and second portions that is separated from the first surface of the substrate by a thickness of the optically transmissive material such that the second portion and the third portion have different respective distances to the first surface;
    where the thickness of the optically transmissive material by which the third portion is separated from the first surface of the substrate is less than 0.1 microns, and/or the second portion of the first optical waveguide core is positioned less than 0.1 microns from the first optical interface of the photonic integrated circuit.

2. The apparatus of claim 1, further comprising a second optical waveguide core formed in proximity to the first surface of the substrate, the second optical waveguide core comprising
    a first portion in optical communication with a second external optical interface,
    a second portion that is (1) in proximity to the first surface of the substrate, and (2) adjacent to the second surface of the substrate, and
    a third portion between the first and second portions that is separated from the first surface of the substrate by a thickness of the optically transmissive material.

3. The apparatus of claim 1, where the acute angle is between about 10 degrees to 80 degrees.

4. The apparatus of claim 1, where the second and third portions are at opposite ends of a segment of the first optical waveguide core that is not straight.

5. The apparatus of claim 1, where the second and third portions are at opposite ends of a curved segment of the first optical waveguide core.

6. The apparatus of claim 1, where the photonic integrated circuit is fabricated on a portion of a silicon-on-insulator wafer.

7. The apparatus of claim 1, where a portion of the first optical waveguide core extends into a trench of the photonic integrated circuit.

8. The apparatus of claim 1, where the first optical waveguide core is optically coupled to at least one passive optical element.

9. The apparatus of claim 8, where the passive optical element comprises a ring resonator or a Sagnac loop.

10. The apparatus of claim 1, where the first optical waveguide core is optically coupled to a wavelength-dependent optical element.

11. The apparatus of claim 1, where the first optical waveguide core is optically coupled to a second optical waveguide core formed in proximity to the first surface of the substrate.

12. The apparatus of claim 11, where the second optical waveguide core is optically coupled to a second optical interface of the photonic integrated circuit.

13. The apparatus of claim 1, where the second portion of the first optical waveguide core is positioned based at least in part on an optical test signal received from the photonic integrated circuit.

14. The apparatus of claim 1, further comprising a second optical waveguide core formed in proximity to the first surface of the substrate that is optically isolated from the first optical waveguide core.

15. The apparatus of claim 1, where the external optical interface further comprises an adhesive with an index of refraction substantially matching an index of refraction of the optically transmissive material.

16. A method for fabricating a coupler for coupling an external optical interface to a first optical interface of a photonic integrated circuit, the method comprising:
    forming a substrate comprising an optically transmissive material; and
    forming a first optical waveguide core formed in proximity to a first surface of the substrate, the first optical waveguide core comprising
        a first portion in optical communication with the external optical interface to couple optical waves between the first portion and the external optical interface,
        a second portion that is (1) in proximity to the first surface of the substrate, and (2) adjacent to a second surface of the substrate at an acute angle with the first surface of the substrate and configured to reflect the optical waves before or after they propagate through the first surface of the substrate, and
        a third portion between the first and second portions that is separated from the first surface of the substrate by a thickness of the optically transmissive material such that the second portion and the third portion have different respective distances to the first surface;
    where the thickness of the optically transmissive material by which the third portion is separated from the first surface of the substrate is less than 0.1 microns, and/or the second portion of the first optical waveguide core is positioned less than 0.1 microns from the first optical interface of the photonic integrated circuit.

17. The method of claim 16, where the second and third portions are at opposite ends of a segment of the first optical waveguide core that is not straight.

18. The method of claim 16, where the second and third portions are at opposite ends of a curved segment of the first optical waveguide core.

19. The method of claim 16, where the first optical waveguide core is optically coupled to a second optical waveguide core formed in proximity to the first surface of the substrate.

20. The method of claim 19, where the second optical waveguide core is optically coupled to a second optical interface of the photonic integrated circuit.

* * * * *